United States Patent [19]

Franklin

[11] Patent Number: 4,526,027
[45] Date of Patent: Jul. 2, 1985

[54] PRE-CALIBRATED FUEL QUANTITY CAPACITIVE PROBE

[75] Inventor: Cecil Franklin, Middlebury, Vt.

[73] Assignee: Simmonds Precision Products, Inc., Tarrytown, N.Y.

[21] Appl. No.: 554,649

[22] Filed: Nov. 23, 1983

[51] Int. Cl.³ .............................................. G01F 25/00
[52] U.S. Cl. .................................... 73/1 H; 73/304 C
[58] Field of Search ............. 73/1 H, 304 C; 361/284

[56] References Cited

U.S. PATENT DOCUMENTS 3,827,300  8/1974  Thaler ............................... 73/304 C Primary Examiner—Donald O. Woodiel
Attorney, Agent, or Firm—Edwin E. Greigg

[57] ABSTRACT

A method and apparatus for pre-calibrating capacitive-type fuel quantity probes is proposed in which a voltage divider excitation source is connected to the low impedence electrode of the probe and is used to trim the apparent capacitance down to within a small tolerance of ±0.1% of the precise design value for the probe.

3 Claims, 1 Drawing Figure

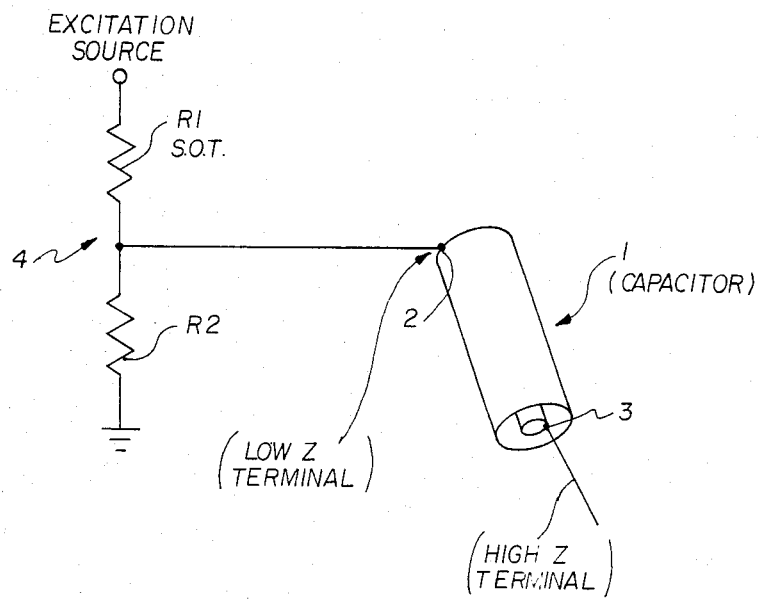

PRE-CALIBRATED FUEL QUANTITY CAPACITIVE PROBE

BACKGROUND OF THE INVENTION

In A.C. capacitive-type guaging systems for fuel quantity measurement in aircraft, such as that described in U.S. Pat. No. 4,020,691, in which stray capacitive effects from aircraft wiring have been shown to have been eliminated by means of suitable rectification of the A.C. signals and subsequent integration thereof to produce an A.C. signal independent of any stray A.C. pickup in the circuit path.

There is a need, however, for compensating for manufacturing tolerances in such capacitive-type probes, and while such compensation can be done in stitu, that is, in-aircraft calibration, it still is desirous and of greater importance to have such calibration done prior to installation in the aircraft, that is, to provide a bench calibration method for such capacitive probes. Also, previous known methods for adjusting capacitance of such probes for calibration purposes involved adjusting the dry capacitance prior to installation—by varying a shunt resistance trimmer connected to one of the plate members, for example—would not correct for error in wet capacitance change due to fuel being the dielectric. Similarly, a method of providing a variable "window" in the outer tube or electrode will make a correction in the overall capacitance by changing the profile at one place, thus introducing an error in profile.

SUMMARY OF THE INVENTION

The invention provides a method of producing capacitive probes in the ordinary way with a tolerance of capacitance of about ±0.5%. The capacitive probe, according to the invention, is designed to produce an initial nominal capacitance which is about 1% higher than the desired end value, or any other anticipated percentage value to cover or compensate for the worst possible tolerance. A further benefit of the method according to the invention is that it provides accuracy for correcting for dry capacitance error as well as wet capacitance error, thus providing for overall proportional correction and preserving accuracy of profile in capacitive probe systems for irregularly shaped fuel containers, such as used in aircraft.

To implement the method according to the invention, a voltage divider comprising one fixed value resistor and one select-on-test resistor is used to trim the apparent capacitance of the probe down to the precise design value within a small tolerance of, for example, about ±0.1%.

The invention will be better understood and further objects and advantages thereof will become more apparent from the ensuing detailed description of a preferred embodiment taking in conjunction with the drawings.

BRIEF DESCRIPTION OF THE DRAWING

A schematic illustration shows the circuitry for implementing the method according to the invention in combination with a capacitive type fuel quantity probe.

DESCRIPTION

Shown in the drawing is a capacitor probe 1 for use in aircraft fuel containers having a concentrically aligned outer electrode and inner electrode. Connected to the outer electrode is a low impedance terminal 2 to which is connected a voltage divider 4 made up of a select-on-test resistor $R_1$ and a fixed value resistor $R_2$ having a value, for example, of 100 $k\Omega$. One end of the divider is connected to an excitation voltage source, for example, 6 KHZ, while the other end is connected to ground. The inner electrode has a high impedance terminal connection 3.

By means of the voltage divider 4, the apparent or real capacitance of the probe 1 is trimmed or adjusted down to a precise design value within a small tolerance of about 35 0.1%. The initial nominal capacitance of the probe then is about 1% higher than the desired end value. Thus, if a concentric tube capacitor produces a high dry capacitance, it follows that its value immersed in fuel will be high by the same proportion.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for pre-calibrating a fuel quantity capacitance-type probe before operational use thereof having a low impedance electrode and a high impedance electrode, comprising
   an excitation source,
   a voltage divider means connected to said excitation source and said low impedance electrode, and
   said voltage divider having a first fixed value resistor and a second resistor whose value is selected to effect the dry value of said probe within a small tolerance of approximately 1% above a given design value of capacitance for said probe.

2. An apparatus according to claim 1, wherein the value of said fixed resistor is approximately 100 $k\Omega$.

3. An apparatus according to claim 2, wherein said excitation source is approximately 6 KHZ.

* * * * *

UNITED STATES PATENT AND TRADEMARK OFFICE
CERTIFICATE OF CORRECTION

PATENT NO. : 4,526,027
DATED : July 2, 1985
INVENTOR(S) : Franklin, Cecil

It is certified that error appears in the above-identified patent and that said Letters Patent are hereby corrected as shown below:

Page 3, Column 2, Line 26 shows:

"of about 35 0.1%."

It should show:

"of about $\pm$ 0.1%."

Signed and Sealed this

Thirty-first Day of December 1985

[SEAL]

Attest:

Attesting Officer

DONALD J. QUIGG

Commissioner of Patents and Trademarks